No. 865,537. PATENTED SEPT. 10, 1907.
J. E. SMITH.
PROCESS OF OBTAINING GAS FROM PEAT.
APPLICATION FILED DEC. 8, 1906.
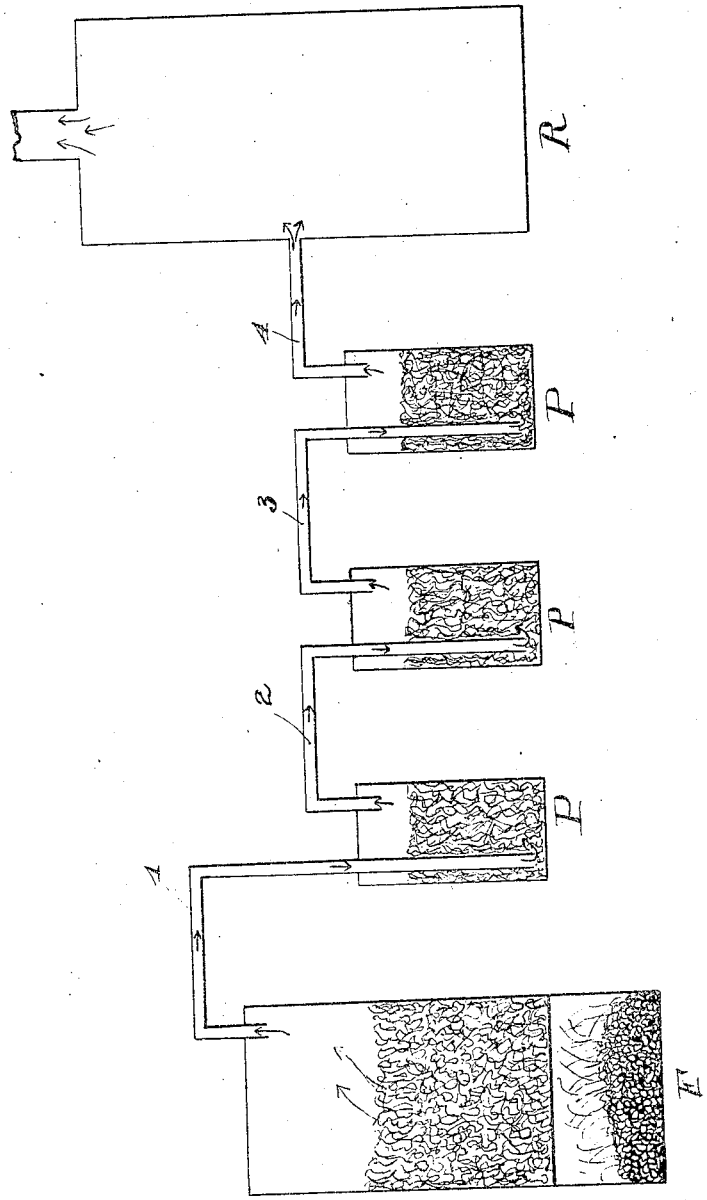
Witnesses:
George E. Higham.
Charles J. Schmidt,
Inventor
James E. Smith
By Charles A. Brown
Attorney.

UNITED STATES PATENT OFFICE.

JAMES E. SMITH, OF CLINTON, IOWA, ASSIGNOR TO NATIONAL PEAT PRODUCTS & CHEMICAL COMPANY, A CORPORATION OF SOUTH DAKOTA.

PROCESS OF OBTAINING GAS FROM PEAT.

No. 865,537.     Specification of Letters Patent.     Patented Sept. 10, 1907.

Application filed December 8, 1906. Serial No. 346,858.

*To all whom it may concern:*

Be it known that I, JAMES E. SMITH, a citizen of the United States, residing at Clinton, in the county of Clinton and State of Iowa, have invented a certain new and useful Improvement in Processes of Obtaining Gas from Peat, of which the following is a full, clear, concise, and exact description, reference being had to the accompanying drawings, forming a part of this specification.

My invention relates to an improved process of obtaining illuminating gas from peat and for purifying the gas.

Peat after it has been dried sufficiently, is placed in a retort and heated to drive the gases therefrom, and the gases from the retort usually contain undesired substances such as moisture, tar and its products and so on, which must be removed from the gas before it is efficient for illuminating purposes. To therefore clean the gas, I provide a number of purifiers, each in the form of a chamber or compartment containing dry peat through which the generated gas must successively pass in the various purifiers, the clean gas being finally led to a reservoir.

In the accompanying drawing I have diagrammatically shown apparatus for illustrating my process, the apparatus comprising the retort or furnace F, the purifiers P, and the reservoir R. The peat after being dried, is charged in the furnace or retort and then heated, the gas with all its impurities passing through the pipe 1 to the bottom of the first purifier, the purifiers also containing dried peat. In the first purifier the gas from the retort led to the bottom of the purifier then circulates upwardly through the peat in the purifier and escapes from the top of the purifier through pipe 2 which leads to the bottom of the second purifier, and the gas circulates upwardly through the peat in the second purifier, escaping then through pipe 3 which leads to the bottom of the third purifier, and the gas circulating upwardly through the peat in this purifier escapes through pipe 4 to another purifier or to the reservoir R. Any number of purifiers may be employed, the number usually being such that the gas that enters the reservoir is as pure and rich as can be obtained, the gas losing part of its impurities upon each passage through a purifier.

After a certain amount of gas has passed through the peat in a purifier, this peat becomes laden with impurities and, therefore, foul, and as soon as this occurs, the peat from the purifiers is charged into the retort to be mixed in any proportion desired with fresh peat therein. This peat from the purifiers when heated in the retort serves to enrich the gas, that is, the products extracted from the gas in this peat when in the purifier being partly vaporized when heated, and these vapors enrich the gas and cause it to give a white flame. The purifiers are, of course, refilled with fresh peat after the foul peat has been removed therefrom.

Of course, the apparatus I have shown in the drawing is merely diagrammatic, and any suitable apparatus may be used for carrying out my process.

I desire to secure the following claims by Letters Patent:

The process of obtaining illuminating gas from peat which consists in subjecting fresh dried peat to the action of heat whereby gas is driven therefrom, then purifying the gas obtained by passing it through dry peat, and then adding the peat through which the gas has been passed, to the fresh peat to be heated therewith to cause enriching vapors to be added to the gas.

In witness whereof, I hereunto subscribe my name this 5th day of December A. D., 1906.

JAMES E. SMITH.

Witnesses:
   CHARLES J. SCHMIDT,
   GEORGE E. HIGHAM.